V. P. HARVEY.
ANGLE COCK.
APPLICATION FILED SEPT. 10, 1910.
1,012,132.
Patented Dec. 19, 1911.
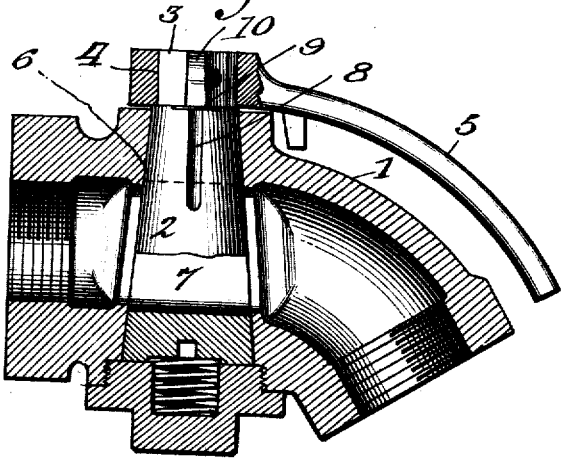
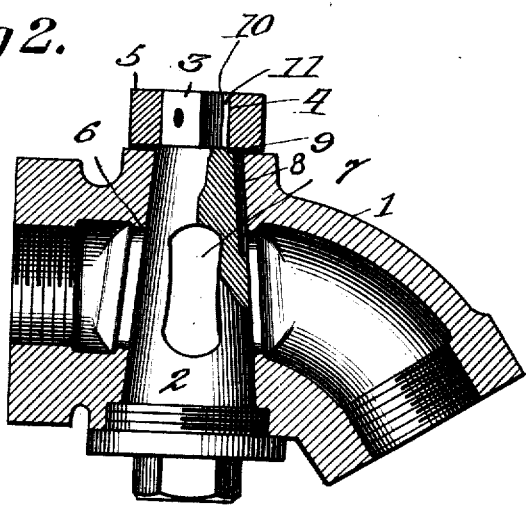
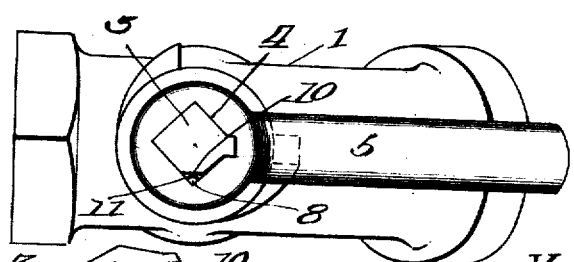
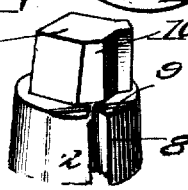
Witnesses
Phil E. Barnes
J. M. Wilson
Inventor
V. P. Harvey
By
Gould & Gould
Attorney

UNITED STATES PATENT OFFICE.

VELVESTUS P. HARVEY, OF ASHTABULA, OHIO.

ANGLE-COCK.

1,012,132.   Specification of Letters Patent.   Patented Dec. 19, 1911.

Application filed September 10. 1910. Serial No. 581,443.

*To all whom it may concern:*

Be it known that I, VELVESTUS P. HARVEY, a citizen of the United States, residing at Ashtabula, in the county of Ashtabula and State of Ohio, have invented certain new and useful Improvements in Angle-Cocks, of which the following is a specification.

The invention relates to an improvement in angle cocks as ordinarily used in air brake systems, and is particularly directed to providing such angle cock with a leakage groove adapted when the cock is turned to cut-off the particular car equipment to form a vent for the air in the hose connections forward of the angle cock, whereby to bleed such hose connection to atmospheric pressure for convenient uncoupling of the hose and the avoidance of breaking or stretching the same.

The invention in its preferred form of details will be described in the following specification, reference being had particularly to the accompanying drawings, in which—

Figure 1 is a longitudinal central section through an angle cock constructed in accordance with my invention, the valve therein being shown in open position. Fig. 2 is a similar view showing the valve in closed position and illustrating particularly the leakage groove. Fig. 3 is a plan of the improved angle cock. Fig. 4 is a perspective of the upper portion of the valve.

In the accompanying drawings, which aside from the specific details hereinafter noted, are designed for conventional illustration only of the parts shown, 1 designates the casing of an ordinary angle cock in which is mounted in the usual manner the tapering plug valve 2. The upper end of the valve projects above the proximate surface of the casing and is formed with a non-circular extension 3 to receive a similarly formed aperture 4 in an operating handle 5. That portion of the valve within the bore 6 of the casing is formed with a port 7 which, when the valve is in open position, as shown in Fig. 1, provides uninterrupted communication through the angle cock, as is usual.

The salient feature of the present invention resides in forming the valve with a leakage groove 8, preferably by channeling or grooving the relatively upper portion of the valve in that surface at right angles to the port 7 and toward the hose-connected end of the angle cock when the latter is closed.

The leakage groove is of comparatively minute proportions and is of such length that its lower end projects into the bore 6 of the casing, while its upper end extends through the valve body to the non-circular handle-receiving portion 3. The shoulder formed by the juncture of the valve body and the non-circular handle-receiving portion is slightly cut away as at 9 at the upper end of the leakage groove to form an escape passage for the air below the handle, and one of the corners of the non-circular portion 3 is cut off throughout the height of the said portion, as at 10, thereby providing, when the handle is in place, an additional escape port 11 between the handle and portion 3. The port 11 is thus alined with the leakage port 8 to more readily permit the escape of the air.

With the improved angle cock in use it will be noted that when the valve is open, as in use of the air brake system, the leakage groove is closed by the usual lining of the angle cock, and is without function, while when the valve is closed the leakage groove is turned toward the hose connection, venting said hose to atmospheric pressure and permitting the convenient uncoupling from the adjacent car, similarly provided.

The invention is designed for venting the hose pipe connections between cars or the like so that in uncoupling no resistance is encountered from the contained vacuum or pressure, and no liability of breaking or stretching the hose results.

The invention is to be carefully distinguished from that type in which the angle cock is provided with means whereby the train pipe throughout is vented, as in such instance the brakes are automatically set and the escape ports of the angle cock have to be of such size as to vent the train pipe rapidly enough to set the brakes. The present leakage groove is simply large enough to vent the hose connections when the angle cock has been turned in the usual manner incident to uncoupling said connections. The present improvement is without effect upon pressure of the train line, and is not designed to effect in any way any part of the equipment other than the hose connections.

It is to be noted that my invention is adapted to be readily applied to the ordinary type of air brake system angle cocks in common use with but very slight modification of the latter and thus full benefit of the principle of the invention can be secured with practically no additional expense over present standard equipment.

Having thus described my invention, what I claim as new and desire to secure by Letters Patent, is:—

An angle cock adapted for connection with the train line at one end and with the connecting hose at the opposite end, said cock including a valve formed with an opening to establish connection between those portions of the cock on opposite sides of the valve, said valve being formed with a vertically-extending leakage groove to establish communication between the atmosphere and the hose end of the angle cock when the valve is in a position to cut off communication between the respective ends of the angle cock, said valve serving to at all times close the train pipe end of the angle cock against the atmosphere except through said valve opening.

In testimony whereof, I affix my signature in presence of two witnesses.

VELVESTUS P. HARVEY.

Witnesses:
A. W. HOPKINS,
B. C. BLAKESLEE.